(12) United States Patent
Treichel

(10) Patent No.: US 10,329,447 B2
(45) Date of Patent: Jun. 25, 2019

(54) POLYMER BASED ROLL COATING

(71) Applicant: DIELECTRIC COATING INDUSTRIES, Hayward, CA (US)

(72) Inventor: Helmuth Treichel, Milpitas, CA (US)

(73) Assignee: DIELECTRIC COATING INDUSTRIES, Hayward, CA (US)

( * ) Notice: Subject to any disclaimer, the term of this patent is extended or adjusted under 35 U.S.C. 154(b) by 654 days.

(21) Appl. No.: 14/686,103

(22) Filed: Apr. 14, 2015

(65) Prior Publication Data

US 2015/0291826 A1    Oct. 15, 2015

Related U.S. Application Data

(60) Provisional application No. 61/979,361, filed on Apr. 14, 2014.

(51) Int. Cl.
*B05D 3/02* (2006.01)
*C09D 133/08* (2006.01)

(52) U.S. Cl.
CPC .......... *C09D 133/08* (2013.01); *B05D 3/0263* (2013.01); *B05D 2202/25* (2013.01); *B05D 2252/02* (2013.01)

(58) Field of Classification Search
CPC .... B05D 3/0263; B05D 7/14; B05D 2202/25; B05D 2252/02
USPC ................................. 427/299, 178
See application file for complete search history.

(56) References Cited

U.S. PATENT DOCUMENTS

| 5,439,747 | A | 8/1995 | Sturdevant et al. |
| 7,541,066 | B2* | 6/2009 | Kawasaki ............... B05D 7/16 427/327 |
| 2003/0072160 | A1 | 4/2003 | Kuepper et al. |
| 2005/0023472 | A1 | 2/2005 | Wei et al. |
| 2006/0243778 | A1* | 11/2006 | Yamaguchi ........... B22F 1/0074 228/101 |
| 2012/0231281 | A1* | 9/2012 | Hirai ...................... C09D 1/00 428/447 |
| 2013/0313888 | A1 | 11/2013 | Uemura et al. |
| 2014/0272433 | A1* | 9/2014 | Bammel .............. C09D 139/04 428/447 |

FOREIGN PATENT DOCUMENTS

| CN | 101654548 A | 2/2010 |
| JP | 2012214816 A | 11/2012 |

* cited by examiner

*Primary Examiner* — Kirsten Jolley
(74) *Attorney, Agent, or Firm* — Avery N. Goldstein; Blue Filament Law PLLC

(57) ABSTRACT

A polymer based coating for application to rolled stock, such as aluminum is provided. A device for applying the polymer based coatings is also provided. Polymer based coatings applied to rolled stock, such as aluminum, are advantageous compared to anodized coatings since the polymers are self-leveling and may be applied to lower grades of aluminum, while still providing a smooth and durable surface finish.

9 Claims, 1 Drawing Sheet

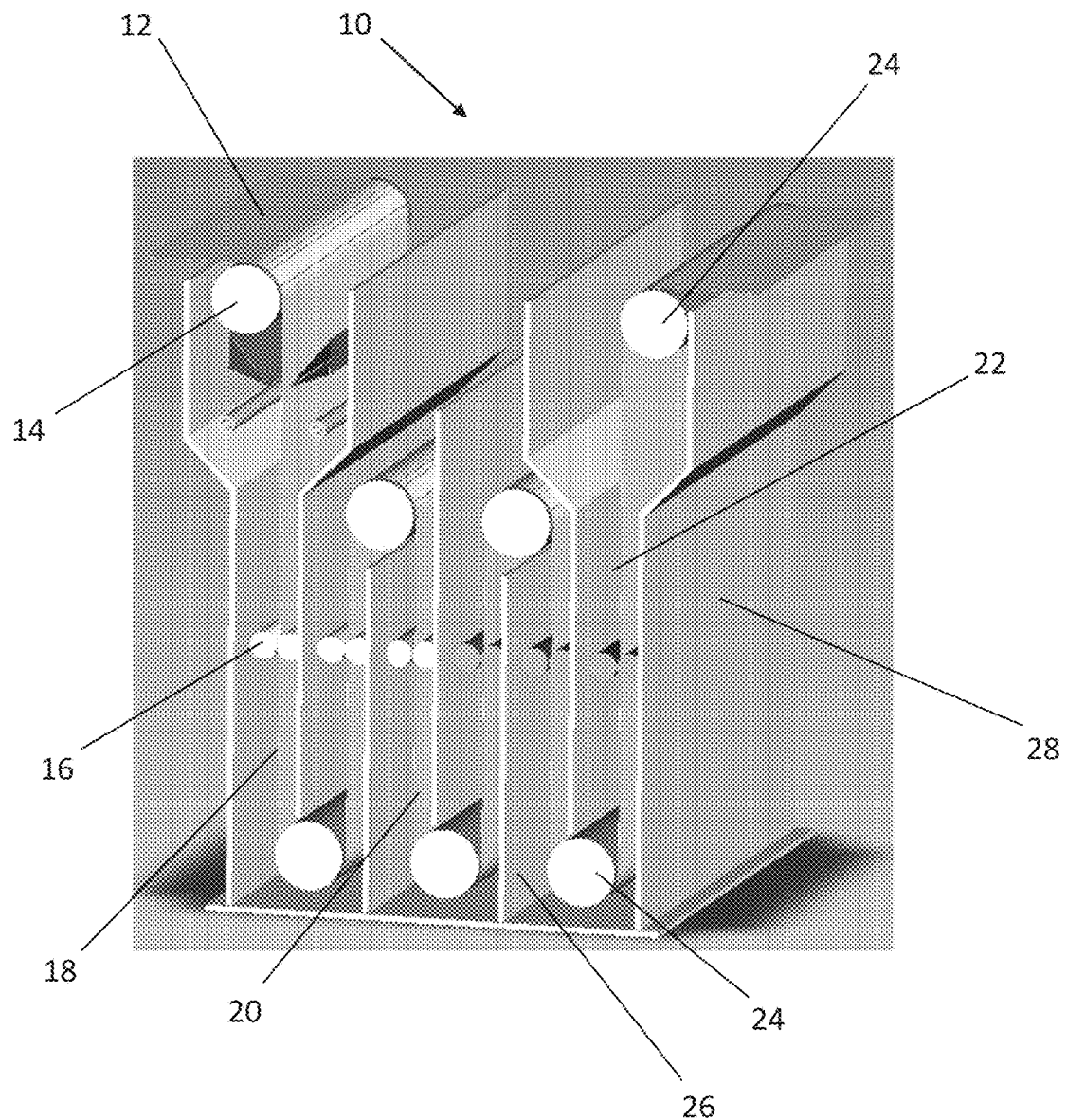

POLYMER BASED ROLL COATING

RELATED APPLICATIONS

This application in a non-provisional application that claims priority benefit of U.S. Provisional Application Ser. No. 61/979,361 filed 14 Apr. 2014; the contents of which are hereby incorporated by reference.

FIELD OF THE INVENTION

The present invention in general relates to coatings, and in particular to a formulation and process for applying polymer based coatings to rolled stock material.

BACKGROUND OF THE INVENTION

Many processes use rolled metal stock material as a starting material for manufacturing. Aluminum is exemplary of these roll stock materials and is often subjected to anodization as a processing step. Anodizing is an electrolytic passivation process used to increase the thickness of the natural oxide layer on the surface of metal parts. The process of application is called "anodizing" because the electrical conductive material to be treated forms the anode electrode of an electrical circuit. Anodizing increases corrosion resistance and wear resistance of the material, and provides improved adhesion of coatings. Anodic films can also be used for a number of cosmetic effects, either with thick porous coatings that can absorb dyes or with thin transparent coatings that add interference effects to reflected light.

Anodic films are most commonly applied to protect aluminum alloys. Aluminum alloys are anodized to increase corrosion resistance and to allow dyeing, improved lubrication, or improved adhesion. Anodizing does not increase the strength of the aluminum object and as the tensile strength of the oxide is less than that of the metal, the overall strength is in some instance reduced and the anodized coating is brittle compared to the underlying base material. Also, the anodic layer is non-conductive and this can complicate further processing. Anodization changes the microscopic texture of the surface and changes the crystal structure of the metal near the surface. Thick coatings are normally porous, so a sealing process is often needed to achieve corrosion resistance. Anodized aluminum surfaces, for example, are harder than aluminum but have low to moderate wear resistance that can be improved with increasing thickness or by applying suitable sealing substances. Anodic films are generally much stronger and more adherent than most types of paint and metal plating, but at the expense of comparative brittleness thereby making anodic films more susceptible to cracking from thermal stress.

Although anodizing produces a generally regular and uniform coating, microscopic fissures in the coating can lead to corrosion. Anodization in oxidizing the surface does not in fact planarize an otherwise rough surface. In addition, surface inclusions of other materials that create imperfections in the anodization coating. Further, the anodized coating is susceptible to chemical dissolution in the presence of high and low pH chemistry, which results in stripping the coating and corrosion of the substrate.

Thus, there exists a need for a coating and processes for applying such a coating to rolled stock, such as aluminum, the coating have properties different than those of anodization.

SUMMARY OF THE INVENTION

A polymer based coating for application to rolled stock, such as aluminum is provided. A device for applying the polymer based coatings is also provided. Polymer based coatings applied to rolled stock, such as aluminum, are advantageous compared to anodized coatings since the polymers are self-leveling and may be applied to lower grades of aluminum, while still providing a smooth and durable surface finish.

A process for applying the improved coating is also provided.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates a perspective view of an immersion coater/drier module for applying coatings to the rolled stock according to embodiments of the invention.

The detailed description explains the preferred embodiments of the invention.

DETAILED DESCRIPTION OF THE INVENTION

The present invention has utility as a polymer based coating for application to rolled stock, such as aluminum. A device and process for applying the polymer based coatings is also provided. The inventive polymer based coatings are advantageous compared to anodized coatings since the polymers are self-leveling and may be applied to lower grades of aluminum while still providing a smooth and durable surface finish. Additionally, while impurity inclusions in the substrate stock constitute defects in an anodized coating, the present invention operates independent of the redox chemistry of the substrate. The present invention is particularly well suited for applying a coating onto a roll material and in particular, aluminum and alloys thereof. The properties of the resulting coated aluminum are particularly well suited for stamping of contoured forms from the rolled material. Such forms illustratively including light reflectors, mirrors, aviation components, structural housings, and vehicle components.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

A polymer coating is applied to a roll substrate to form a flexible environmental barrier that provides the aforementioned benefits relative to anodization. In contrast to paints that do not protect the underlying substrate owing to porosity and limited covalent bonding to the substrate, the inventive coatings protect the underlying substrate material from corrosion as measured by ASTM B368. An additional attribute of the present invention is that the resulting coating has a high degree of transparency of more than <5% or a reflectivity>95% as measured by E1349.

An inventive coating composition is formed by the application of a thermoset precursors or thermoplastic resins under conditions that allow the resin to self-level and form a layer having planarity properties that are amenable to application of an additional topcoat layer. Thermoset precursors operative herein illustratively include diallylphthalates, epoxies, furans, imides, melamines, phenolics, polyesters, urethanes, and combinations thereof. In certain embodiments using polyesters, ethylenically saturated polyesters are used. In certain embodiments, the thermoset precursor is one of ethoxylated-3-bisphenol-A diacrylate, trifunctional aliphatic epoxy acrylates, trifunctional acid esters, methyl acrylate, methyl methacrylate, butyl acrylate, butyl methacrylate, styrene, N-ethoxymethyl acrylamide, and N-butoxymethyl acrylamide. It is appreciated that cure of thermoset precurors is readily accomplished by free radical polymerization across ethylenic unsaturations in the thermoset precursor. Free radical polymerization is well known to the art and includes the inclusion of a variety of cross-linking agents that that illustratively include isocyanates, amides, urea, amines, and combinations thereof. As used herein, infrared light (IR) and/or ultraviolet (UV) light induced curing of thermoset precursors are considered a subset of free radical polymerization. Conventional free radical polymerization initiators also may contain a peroxide or azo moiety. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. Typical loadings of cross-linking agents range from 0.1 to 3 total weight percent of the thermoset precursor applied to the substrate. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

A cross linked thermoset resin is considered to form a suitable coating on a roll substrate material when the coating for planarization has at least one property of: short time drying, on the order of less than 60 minutes; and a deposited mirror layer on the inventive top coat maintains a reflectivity>95%. A coating for passivation has at least one property of: passing the "TIDE test" (ASTM B117); the "tape" (ASTM 3359); scored test (ASTM B1654); and a deposited mirror layer on the inventive top coat maintains a reflectivity>95%. It is appreciated that thermoset precursor formulations in certain embodiments illustratively include conventional additives such as flow control agents, rheology modifiers, and anti-foaming agents.

Thermoplastic resins operative herein illustratively include acrylics; acrylonitrile butadiene styrenes (ABS); alkyds, polyamides (nylons); polycarbonates; polyalkylenes such as polyethylenes and polypropylenes; polystyrenes; polyvinyl chlorides (PVC); and combinations thereof. It is appreciated that self-leveling of a thermoplastic resin requires that the resin be applied at a temperature that allows flow on the substrate.

In certain inventive embodiments, silanols or reactive precursors thereof are bonded to the underlying substrate. Such silanol or reactive precursors thereto are applied prior to application of a thermoset or thermoplastic or admixed therewith. Without intending to be bound to a particular theory a reactive silanol moiety is present in an added molecule or formed from a precursor. The silanol then condenses with native oxides of aluminum, zirconium, tin, titanium, or nickel present on the surface of the substrate roll material. A stable precursor often is hydrolyzed to form a silanol moiety simply through exposure to ambient atmospheric humidity or moisture adhered to the substrate surface. Alternatively, silanol precursors are activated through addition of water or alcohols. Such silanol precursors are typically applied in an amount to form between 0.5 to 2 total weight percent of the coating.

Silanol precursors illustratively include hexamethyldisiloxane (HMDSO), TOMCATS, tetraethyl orthosilicate (TEOS), 3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl) methyldiethoxysilane, (3-glycidoxypropyl) dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, and combinations thereof. It is appreciated that the inclusion of such precursors reactive with substrate oxides promote resistance to the Tide-test.

Embodiments of the inventive coatings may act as a planarizing layer or passivation layer over a mirror surface finish substrate. The inventive coatings substances of thermoset precursors or thermoplastic resins are in some embodiments diluted with a solvent to reduce coating formulation viscosity and thereby enhance self-leveling as the coating forms. In certain embodiments, the thermoset precursors or thermoplastic resins represent from 2.5 to 35% of the volume of a solvent. It is appreciated that the nature of the coating precursor or resin dictates suitable solvents. Typical solvents operative herein illustratively include acetone, isopropanol, ethylacetate, triethylacetate, methyl ethyl ketone (MEK), tertiary butyl acetate (TBA) and combinations thereof.

In specific embodiments the target thickness of the applied coating is greater than 2 microns, while in other embodiments the thickness is between 2 and 10 microns. In some embodiments, an inventive coating has a target reflectivity of over 95% as measured by E1349. The inventive passivation layer is designed to withstand a Tide test for over 8 hours at 40° C. with no compromise to the surface reflectivity.

The process for applying the inventive polymer based coating may include spray-on, roll-on, or immersion in a coating bath, or a combination thereof. In some embodiments, the applied coating formulation is exposed to Infrared (IR) and/or Ultraviolet (UV) light to facilitate hardening of the film. Typical light exposure times are for <30 seconds up to 5 minutes.

FIG. 1 illustrates a perspective view of an immersion coater/drier module 10 (not to scale) for applying coatings to the rolled stock 12 according to embodiments of the invention. The rolled stock substrate, 12, such as aluminum, is unrolled and travels on and along rollers 14 and guides 16 through three stages or zones of treatment: pre-cleaning 18, immersion coating 20, drying and curing 22. The stages or zones (18, 20, 22) are separated by dividing walls 26, and the entire module 10 is enclosed by insulating walls 28.

In an embodiment of the coating process, the pre-cleaner in the pre-cleaner zone 18 may be an isopropyl alcohol (IPA) or other solvent. In the immersion zone 20, the coating may be an acrylic solvent, polymers, etc. In the drying and curing zone 22, the coating applied to the rolled stock 12 may be cured with IR or UV light from a lamp, or via direct contact with heated rollers 24.

The resulting coated substrates are readily subjected to deposition of additional layers onto the coating. Such layers illustratively including metals, metal salts, polymers and combinations thereof. Such layers are readily applied by conventional techniques such dip coating, spray coating, physical vapor deposition, or chemical vapor deposition. Such layers are applied to the unrolled substrate, planar pieces cut from the substrate, or contoured forms cut from the substrate. Illustrative of such layers are magnesium fluoride, titanium oxide, or a combination thereof.

EXAMPLES

The present invention is further detailed with respect to the following non-limiting examples. These examples are intended to illustrate specific embodiments of the present invention. The appended claims should not be construed as being limited by the scope of these examples.

Example 1

SR531 is a low viscosity monofunctional acrylate monomer that is used in a variety of UV/EB-cured applications, including inks, wood coatings, stereolithography, and photopolymer printing plates. SR531 is tough, flexible, nonyellowing, and imparts adhesion to a variety of substrates. Performance properties include: adhesion, flexibility, low shrinkage and weatherability. 5 Vol % of SR531 is dissolved in MEK are rolled onto a degreased aluminum substrate using a smooth roller bar (e.g. AP-1/2X00; application ahead of roller). The layers are then exposed to infrared light for 2 minutes. Results:
Planarization: coated with $MgF_2$/TiOx mirror layer results in reflectivity of 96%
Passivation: Reflectivity of 96% is not compromised by Tide test.

Example 2

CN133 is a low viscosity aliphatic triacrylate oligomer. CN133 is fast curing, chemical resistant, and produces strong, flexible films. CN133 is recommended for applications where good film strength and hardness are required. Suggested applications include coatings, floor, metal and wood coatings, electronics, solder masks, inks, and overprint varnishes. 5 Vol % of CN133 is dissolved in isopropanol and 0.5 Vol % TOMCATS is added, and rolled onto a degreased aluminum substrate using a roller bar (e.g. wire AP-1/2X02 1/2; application ahead of roller). The layers are then exposed to infrared light for 2 minutes. Results: Planarization: coated with $MgF_2$/TiOx mirror layer results in reflectivity of 95%; and Passivation; Reflectivity of 95% is not compromised by Tide test.

The foregoing description is illustrative of particular embodiments of the invention, but is not meant to be a limitation upon the practice thereof. The following claims, including all equivalents thereof, are intended to define the scope of the invention.

The invention claimed is:

1. A process for coating rolled material substrate, said process comprising:
   unrolling the rolled material stock of aluminum or an aluminum alloy to expose a metal surface having native oxides thereon;
   pre-cleaning the rolled material substrate with a solvent that retains the native oxides;
   applying a polymeric coating formulation directly onto the native oxides on the metal surface after pre-cleaning the rolled material substrate with the solvent; and
   hardening said polymeric coating formulation into a coating on the native oxides the rolled stock substrate, said coating having a reflectivity of greater than 95% and withstanding a Tide test for over 8 hours at 40° C. with no compromise relative to as-formed surface reflectivity.

2. The process of claim 1 wherein said polymeric coating formulation further comprises a silanol or a silanol precursor reactive with a native oxide the native oxides on the metal surface.

3. The process of claim 2 further comprising forming more than 0.01 monolayers of said silanol or said silanol precursor on the native oxides on the metal surface.

4. The process of claim 3 wherein silanol or said silanol precursor is present at between 0.5 to 2 total weight percent of the coating.

5. The process of claim 1 wherein said polymeric coating formulation comprises between 2 and 35 total weight percent of precursors of said coating.

6. The process of claim 1 further comprising exposing said polymeric coating formulation to infrared or ultraviolet radiation output from a lamp.

7. The process of claim 1 wherein the drying of said coating is with direct contact with a heated roller.

8. The process of claim 1 wherein said polymeric coating formulation comprises a thermoset precursor.

9. The process of claim 1 wherein said coating is diluted with a solvent and wherein said coating is from 2.5 to 35% of the volume of the solvent.

* * * * *